Figure 1:
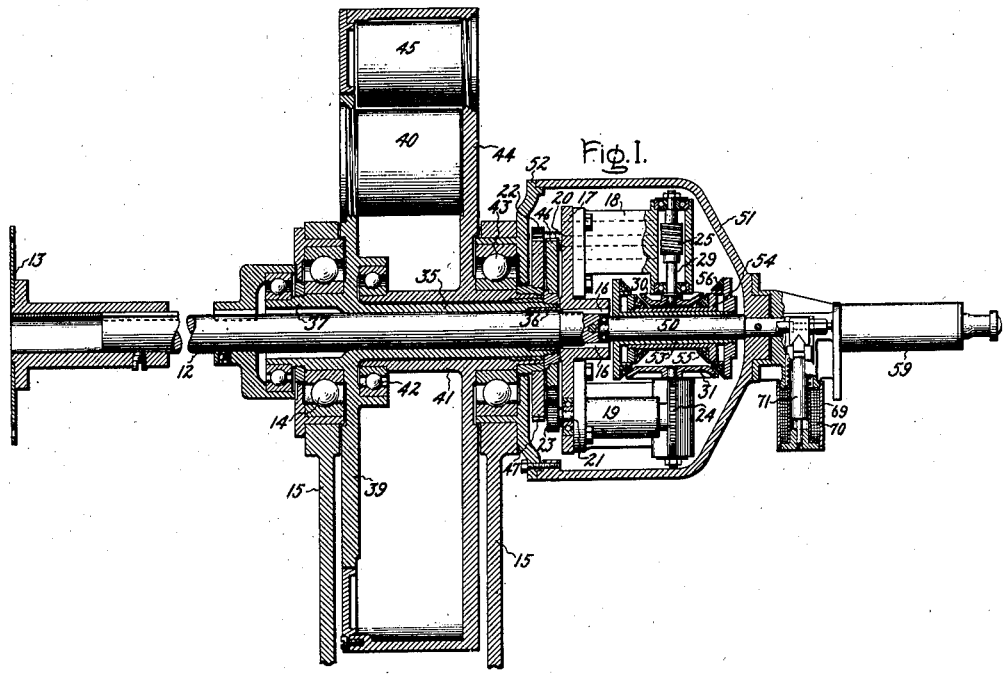

Sept. 6, 1932.  E. L. THEARLE ET AL  1,876,527

BALANCING HEAD

Filed Aug. 14, 1931  2 Sheets-Sheet 1

Inventors:
Ernest L. Thearle,
Albert B. Hubbard,
by Charles V. Tullar
Their Attorney.

Sept. 6, 1932.   E. L. THEARLE ET AL   1,876,527
BALANCING HEAD
Filed Aug. 14, 1931   2 Sheets-Sheet 2
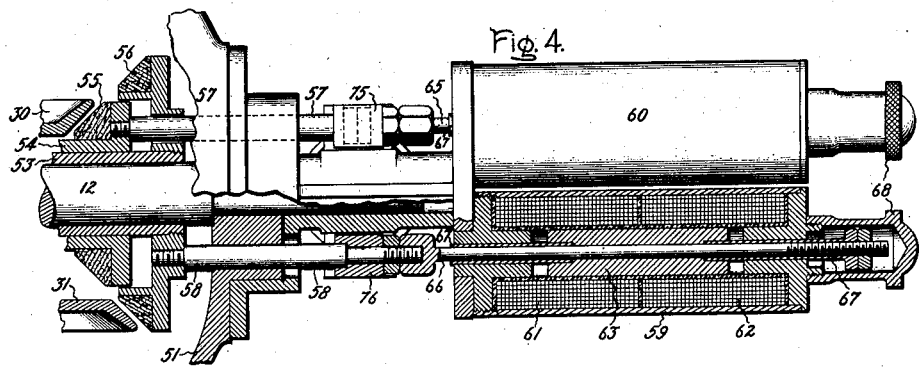
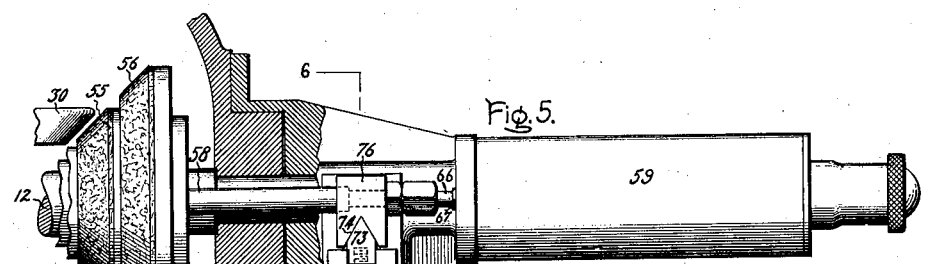
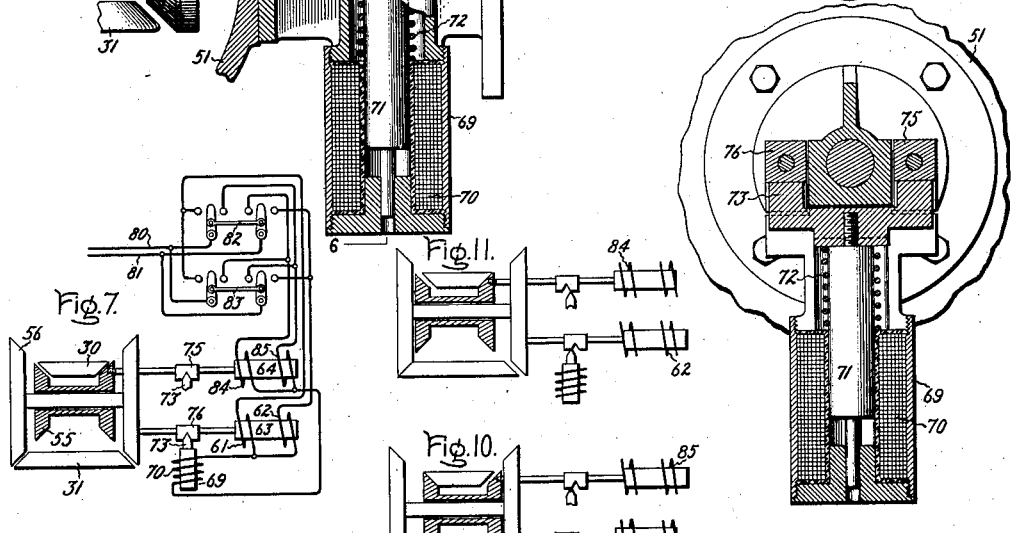
Inventors:
Ernest L. Thearle,
Albert B. Hubbard,
by Charles E. Tullar
Their Attorney.

Patented Sept. 6, 1932

1,876,527

UNITED STATES PATENT OFFICE

ERNEST L. THEARLE AND ALBERT B. HUBBARD, OF SCHENECTADY, NEW YORK, ASSIGNORS TO GENERAL ELECTRIC COMPANY, A CORPORATION OF NEW YORK

BALANCING HEAD

Application filed August 14, 1931. Serial No. 557,150.

The present invention relates to balancing heads for use with machines designed to dynamically balance rotors or bodies of various kinds. Briefly stated, these machines comprise means for elastically supporting the rotor or body to be balanced and means for alternately pivotally supporting the body in two axially spaced selected planes. One suitable way to accomplish this is to provide a cradle in which the body is rotatably mounted and to support the cradle on springs. In addition, releasable fulcra are provided for the cradle in suitably selected planes so that the cradle is free to vibrate one end at a time due to an unbalanced mass in the rotor or body. On the shaft of the body or on an extension thereof and rotating in synchronism therewith is a balancing head carrying a pair of weights which may be adjusted angularly one with respect to the other or both weights may be adjusted as a unit when the body and head are revolving, to the end that the amount and location of the unbalanced mass of the body may be determined.

In our prior application for Letters Patent Serial No. 552,776, filed July 23, 1931, is disclosed a balancing head of the same general character as that illustrated herein. The balancing head of said application is intended more especially for use in balancing bodies of such weight and size that the operator can make the necessary observations and adjustments from one position by means of a manually actuated means, such as a hand lever. The present balancing head is intended more especially for balancing heavy bodies and particularly those of considerable axial length, where it is necessary for the operator to make observations from rather widely separated positions. To meet this situation means are provided whereby the operator is permitted to move about as occasion demands and to make the necessary adjustments of the weights carried by the head without limitation as to his position, when so doing. In other words, to provide remote control for the head. Other features of improvement are (1) the arrangement of parts whereby the weight actuating parts can be moved into and out of engagement rapidly, thereby increasing the sensitivity of the apparatus, (2) means whereby the pressure on the rollers is either on or off and by means of which the amount of said pressure is fixed by the design, and (3) means whereby the return of the parts to their respective neutral positions is rendered positive. Other features of improvement will be pointed out in detail hereinafter.

For a consideration of what we believe to be novel and our invention, attention is directed to the accompanying description and the claims appended thereto.

Figure 2:
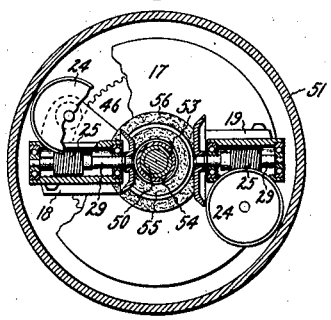
Figure 3:
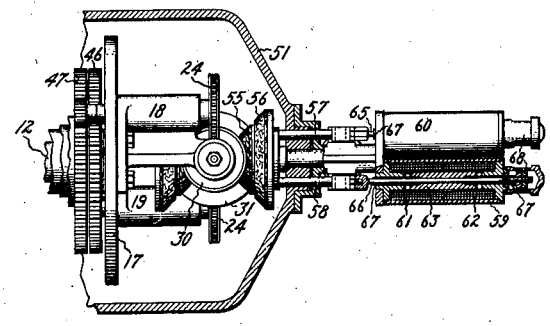

In the accompanying drawings illustrating an embodiment of our invention, Fig. 1 is an axial section of a balancing head; Fig. 2 is a cross-section with certain of the parts broken away; Fig. 3 is a partial view of one end of the head showing one of the main actuating magnets in section; Fig. 4 is a somewhat enlarged view showing the means whereby the magnets are enabled to move the friction wheels or rollers into and out of service; Fig. 5 is a detail view showing the locking and restoring means; Fig. 6 is a sectional view, taken on line 6—6 of Fig. 5; Fig. 7 is a diagram of the circuit connections of the magnets, and Figs. 8 to 11 inclusive are diagrams showing different positions of the operating parts.

Referring to Fig. 1, 12 indicates a shaft which is connected by a suitable coupling as 13 to the shaft of the body being balanced, and therefore rotates at the same speed. The shaft 12 is mounted in suitable bearings 14 carried by the cross members 15 of the elastically supported cradle which supports said body as well as the head. Since the cradle is not necessary to an understanding of our present invention it has not been illustrated as a whole. As shown, ball bearings are shown but other types of bearings may be employed. To the right-hand end of the shaft is secured as by a key 16, a disk 17 so as to rotate at the same speed. Secured to the side face of the disk are two members 18 and 19 containing shafts 20 and 21 supported in ball or other type bearings. On the left hand end of shaft 20 is a pinion 22 and on the left hand end of shaft 21 is a pinion 23, both of which are employed in adjusting the balancing weights, as will appear later. On the right hand ends of the shafts 20 and 21 are worm wheels 24 each of which meshes with a worm 25 carried by a shaft 29 that extends radially to the axis of the head. On the inner end of the upper shaft is a cone-shaped roller 30, and on the inner end of the lower shaft is a cone-shaped roller 31. The rotation of these rollers causes the worms 25 and worm wheels 24 to turn the pinions 22 and 23 to turn and adjust the balancing weights, as will appear later.

The supporting means for the balancing weights will now be described. 35 indicates a sleeve which loosely surrounds the main central shaft 12. At its right hand end is a bushing 36 which acts as a bearing on the shaft 12. The left hand end has a tubular extension 37 supported by a ball or other bearing 14 carried by the left hand frame bar of the cradle. Formed integral with the sleeve 35 is a disk 39 which carries the balancing weight 40. This weight or its container is held in position by screw threaded means.

Surrounding the sleeve 35 and loosely mounted thereon is a second sleeve 41 carried by ball or other bearings. Of these bearings 42 is carried by the disk 39 and bearing 43 by the right hand frame bar 15. This second sleeve carries a disk 44 which in turn supports the second weight 45. This weight is secured to the disk in the same manner as weight 40. These two weights are located at different distances from the axis of the head, and for that reason the outer weight is made just enough smaller than the inner weight so that both exert the same effect on the head and body being balanced when revolving at all speeds. The purpose in locating the weights at different distances from the axis of revolution is so that one can pass the other in the balancing operation instead of being limited to a certain predetermined arc of a circle. On the right hand end of the inner sleeve is rigidly secured as by screw threads a gear 46 which is turned by the previously described pinion 23 carried by the rotating disk 17. To the right hand end of the outer sleeve 41 is threaded or otherwise secured a gear 47 which meshes with the previously described pinion 22 carried by the rotating disk 17. It will be seen that as said disk rotates it will through the pinions and gears rotate both of the weights and their supporting disks.

In a device of this kind it is necessary to move the weights while the head is rotating which either increases or decreases the effect of unbalance in the body being balanced. This increase or decrease will depend upon whether the weights are moved in circular paths toward or away from each other. It is also necessary at times to move the weights as a unit in a circular path either forwardly or backwardly to change the phase angle. By phase angle is meant the angular relation existing between say the light spot on the body being balanced and the center of gravity of the mass of the two weights. Moving the weights as a unit circumferentially toward the position approximating the light spot of the body will have the effect of decreasing the amplitude of oscillation of the system as a whole which includes the body being balanced.

Having briefly outlined the requirements, we will now describe the means by which these various movements may be accomplished. 50 indicates a cylindrical nonrotating spindle the right hand end of which is secured to the hub-like portion of a stationary housing 51, said housing being rigidly secured to a part of the cradle 15 by the member 52. The inner end of the spindle is supported by the adjacent end of the rotating shaft 12, and because one part rotates and the other does not a ball or other bearing is situated between the two. So far as the ultimate effect is concerned, the spindle might stop short of the shaft but the arrangement shown is desirable to ensure good support for the inner end of the spindle and also perfect alignment.

On the spindle 50 are mounted two concentric spool-like sleeves, an inner sleeve 53 and an outer sleeve 54. Both sleeves are arranged to reciprocate but not turn on the spindle and have opposed conical surfaces 55 and 56. The inner conical surfaces 55 are arranged to alternately engage the roller 30 and the other conical surfaces 56 the roller 31. These surfaces form tracks or track wheels with which the rollers engage and are rotated thereby. The spools or track wheels when moved to the right cause the rollers to turn in one direction and when moved to the left cause rotation of the rollers in the opposite direction. The wheels may be moved in the same axial direction or one may be moved to the right and the other to the left. Rotation of the rollers through the intermediate means causes the pinions 22 and 23 to turn the gears meshing therewith and hence move the weights in their respective circular paths.

Referring more particularly to Figs. 3 to 6, the means for moving the track wheels into and out of frictional engagement with the rollers will be described. To the inner track wheel is attached a rod 57 which is guided in its reciprocating movements by the housing. The outer track wheel is similarly provided with a rod 58. These rods are actuated by solenoid magnets 59 and 60, each of which has two windings. In the case of the magnet 59 they are indicated by numerals 61 and 62 which act upon a common armature 63. The armature of magnet 60 is indicated by numeral 64. The armatures are mounted on sliding rods 65 and 66 and these in turn are connected through screw threads and lock nuts to the rods 57 and 58. The rods are guided in non-magnetic bushings 67, and the outer ends are encased in housings 68. By energizing first one and then the other of each of the two pairs of magnet coils the track wheels may be moved as desired.

In a device of this character, especially for balancing heavy bodies where it would be dangerous to immediately bring them up to resonant speed, it is necessary to bring them up to speed step-by-step. This means that arrangements should be provided to quickly and positively move the track wheels out of engagement with the rollers. For this purpose a locking and restoring means is provided in the form of a third magnet 69, the winding of which is permanently connected in circuit with the windings of the other magnets so that no matter which circuit is closed it receives current. This third magnet has a winding 70, an armature 71, and a coiled compression spring 72 which tends at all times to raise the armature. Secured to the upper end of the armature is a locking member or latch 73 having a pair of oppositely beveled sides which fit into inverted V-shaped notches 74 in blocks 75 and 76 carried by the rods 57 and 58. Thus it will be seen that one locking member suffices for both rods. When the circuit is closed through the magnet the latch is removed and either or both of the main magnets 59 and 60 are free to act on the track wheels.

The advantage in the form of control mentioned above resides in its simplicity and sensitivity because engagement and disengagement of the track wheels and rollers is made rapidly, and the pressure between said parts is a definite and fixed amount. The return to neutral position of the parts is positive because the latch slips into the notches in the blocks and thus ensures complete disengagement or separation of the wheels and rollers. In this connection it is to be noted that the total axial movements of the track wheels are relatively small and less than the width of the bottom of the V-shaped notch 74. This means that when the locking magnet 70 is deenergized, the spring 72 forces the beveled ended locking detent or latch 73 upward and one or the other of its side surfaces engages inclined surfaces of the notches and positively restores the track wheels, armatures and associated parts to their respective initial positions. By utilizing a latch which is biased to its active position, the parts will automatically be restored to their propor positions as soon as the circuit of the magnets is broken. Furthermore, and what is of outstanding importance, the operator of the balancing machine can move about from one position to another and take with him the switches which control the various circuits instead of being confined to one place or position.

In Fig. 7 is illustrated the circuit connections of the several magnets and the switches for controlling the circuits. 80 and 81 indicate the conductors leading from a lighting circuit or other source of current supply, and 82 one of the double pole switches and 83 the other. Assuming that the switch 82 is moved to the left current flows from the conductor 80 to the winding 61, thence through winding 70 of the locking magnet and the winding 84 and back through the other blade of switch 82 to the conductor 81. As a result of this the right hand part of the large track wheel 56 is moved into engagement with the roller 31 and the right hand end of the smaller track wheel is moved into engagement with the roller 30. With the circuits closed as above described the parts are in the position shown in Fig. 8. As a result of this pinions 22 and 23 of Fig. 1 are caused to rotate their meshing gears 46 and 47 which in turn cause the weights 40 and 45 to move as a unit, for example in a clockwise direction to change the phase relation. Moving the blades of switch 82 to the right energizes main magnet coil 62, locking magnet 70 and main magnet 85 with the result of moving the parts to the position shown in Fig. 9. This causes a reversal of the movements of the pinions 22 and 23 and their meshing gears 46 and 47. If in the former case the motions were such as to move the weights 40 and 45 clockwise in the latter case the movements are such as to cause them to move anti-clockwise. As will be appreciated, the direction of movement will depend upon the direction of rotation of the shaft 12 and its disk 17.

With the switch 82 open and the blades of switch 83 moved to the left, the circuit is closed through main magnet coil 61, locking magnet 70 and main magnet coil 85 to the other side of the source of current supply. Under these conditions the rollers 30 and 31 are moved into engagement with the track wheels as shown in Fig. 10 with the result, say, of moving the weights 40 and 45 toward each other. With the blades of switch 83 moved to the right, the circuit is closed through main magnet coil 84, locking magnet 70, and main magnet coil 62 to the other side of the source of current supply. Under these conditions the rollers 30 and 31 are moved into engagement with the track wheels as shown in Fig. 11 with the result that the weights 40 and 45 are moved in the opposite direction from that due to the position of the parts shown in Fig. 10, say, away from each other.

In practice, the switches 82 and 83 are mounted in a small insulated container and the various circuit wires are formed in a flexible cable so that the operator can hold the container in his hand and move about from place to place dragging the cable along.

We have not attempted to describe the operations of balancing a body by means of the balancing head herein described, for that is fully set forth in our pending application previously referred to. It is sufficient for the present purposes if it be understood that by means of the controlling means described the weights 40 and 45 may be moved as a unit forwardly or backwardly with respect to a datum point on the head, and that the weights may be moved toward each other and also away from each other, and that in every case the locking magnet has first to release the parts, and that on breaking the circuit the parts of the locking magnet positively move the rollers 30 and 31 to their neutral positions where they are out of engagement with the track wheels.

What we claim as new and desire to secure by Letters Patent of the United States, is:

1. In a head for a balancing machine, the combination of a rotary supporting means, a driving shaft therefor, a pair of weights carried by the supporting means, devices for moving the weights on the supporting means independently of the rotary movement thereof, means for actuating the devices, magnetic means controlling the operation of the actuating means, and a lock for the magnetic means which must be released before the latter can operate.

2. In a head for a balancing machine, the combination of a rotary supporting means, a driving shaft therefor, a pair of weights carried by the supporting means, devices for moving the weights on the supporting means independently of the rotary movement thereof, means for actuating the devices, magnetic means controlling the operation of the actuating means, and a magnetically actuated lock, the coil of which is in circuit with the magnetic means so as to release the lock whenever the circuit is closed.

3. In a head for a balancing machine, the combination of a rotary supporting means, a driving shaft therefor, a pair of weights carried by the supporting means, devices for moving the weights on the supporting means independently of the rotary movement thereof, means for actuating the devices, a pair of main magnets for controlling one of the actuating means, a second pair of main magnets for controlling another of the actuating means, a self-closing lock, and a magnet for releasing the lock whenever the circuit of a main magnet is closed.

4. In a head for a balancing machine, the combination of a rotary supporting means, a driving shaft therefor, a pair of weights carried by the supporting means, gearing for moving the weights on the supporting means independently of its rotation, rollers and track wheels for imparting movements to the gearing, magnets for causing engagement of the rollers and track wheels, and a switch for controlling the circuits of the magnets.

5. In a head for a balancing machine, the combination of a rotary supporting means, a driving shaft therefor, a pair of weights carried by the supporting means, gearing for moving the weights on the supporting means independently of its rotation, rollers and track wheels for imparting movements to the gearing, main magnets for causing engagement of the rollers and track wheels, a self-seating magnetically actuated lock for normally holding the rollers and track wheels in spaced relation, and a switch for closing the circuit of the magnet lock to release it whenever the circuit of a main magnet is closed.

6. In a head for a balancing machine, the combination of a rotary supporting means, a driving shaft therefor, a pair of weights carried by the supporting means, gearing for moving the weights on the supporting means independently of its rotation, rollers and non-rotatable track wheels for imparting movements to the gearing, main magnets when energized for moving the track wheels into engagement with the rollers, a lock biased to its operative position where it holds the track wheels out of engagement with the rollers, a magnet for moving the lock to its inoperative position, and a switch for closing the circuit of the last named magnet whenever the circuit of a main magnet is closed.

7. In a head for a balancing machine, the combination of a rotary supporting means, a driving shaft therefor, a pair of weights carried by the supporting means, gearing for moving the weights on the supporting means independently of its rotation, rollers and non-rotatable track wheels for imparting movements to the gearing, rods for moving the track wheels into and out of engagement with the rollers, a pair of main magnets and an armature for actuating each of the rods, a locking member carried by each rod, a second locking member biased to engage the first locking members, a magnet in circuit with all of the main magnets for moving the second locking member out of engagement with the first, and a portable switch for controlling the circuits of all of the magnets.

8. In a head for a balancing machine, the combination of a rotary supporting means, a driving shaft therefor, a pair of weights carried by the supporting means, gearing for moving the weights in a circular path independently of the support as the parts rotate, rollers carried by the support, track wheels in alignment with the shaft and held against rotation, said wheels being movable axially into and out of engagement with the rollers, magnetically controlled locking means normally holding the track wheels and rollers out of engagement, other magnetic means for moving the track wheels into engagement with the rollers, and a circuit controller which causes the locking means to be energized to release its parts each time the circuit is closed.

9. In a balancing head, the combination of a pair of concentric track wheels, rollers arranged for intermittent rolling contact with the wheels, reciprocating means for moving the track wheels into engagement with the rollers, and a device for positively moving the track wheels out of engagement with the rollers when the said means become inactive.

10. In a balancing head, the combination of a pair of concentric track wheels, rollers arranged for intermittent rolling contact with the wheels, reciprocating means for moving the track wheels into engagement with the rollers, members moved by the reciprocating means having notches therein, the open end of the notches being at least equal to the travel of the means, a latch adapted automatically to enter the notches and in so doing move the means when they are inactive, and a means for withdrawing the latch when it is desired to actuate said means.

11. In a balancing head the combination of a pair of disks, means including a shaft for rotating the disks, a weight carried by each of the disks, said weights differing in mass and located at different radial distances from the axis of the shaft so that they are free to move by one another in circular paths, and means for moving the disks and weights as a unit or separately about the axis of the shaft and independently of rotation thereof.

In witness whereof we have hereunto set our hands.

ERNEST L. THEARLE.
ALBERT B. HUBBARD.